United States Patent
Wiker et al.

(10) Patent No.: US 10,746,410 B2
(45) Date of Patent: Aug. 18, 2020

(54) COOKING OVEN POWER MODULATION SYSTEM AND METHOD

(71) Applicant: THE MIDDLEBY CORPORATION, Elgin, IL (US)

(72) Inventors: John H. Wiker, Serena, IL (US); William S. Schjerven, Sr., Schaumburg, IL (US); Theodore James Chmiola, Roscoe, IL (US); Richard H. Van Camp, Aurora, IL (US)

(73) Assignee: THE MIDDLEBY CORPORATION, Elgin, IL (US)

( * ) Notice: Subject to any disclaimer, the term of this patent is extended or adjusted under 35 U.S.C. 154(b) by 402 days.

(21) Appl. No.: 15/637,763

(22) Filed: Jun. 29, 2017

(65) Prior Publication Data

US 2019/0003720 A1  Jan. 3, 2019

(51) Int. Cl.
| | |
|---|---|
| *F24C 7/08* | (2006.01) |
| *H05B 1/02* | (2006.01) |
| *F24C 3/12* | (2006.01) |
| *A21B 1/46* | (2006.01) |
| *A21B 1/40* | (2006.01) |
| *A21B 1/24* | (2006.01) |

(52) U.S. Cl.
CPC .............. *F24C 7/088* (2013.01); *A21B 1/245* (2013.01); *A21B 1/40* (2013.01); *A21B 1/46* (2013.01); *F24C 3/128* (2013.01)

(58) Field of Classification Search
CPC .......... F24C 7/085; F24C 7/086; F24C 7/088; F24C 3/124; F24C 3/128; F24C 15/322; H05B 1/0263; A21B 1/245; A21B 1/40; A21B 1/46

USPC ........................................................ 219/388
See application file for complete search history.

(56) References Cited

U.S. PATENT DOCUMENTS

| | | |
|---|---|---|
| 6,655,373 B1 | 12/2003 | Wiker |
| 6,684,875 B1 | 2/2004 | Schjerven, Sr. et al. |
| 7,592,570 B2 | 9/2009 | Yoder et al. |
| 7,800,023 B2 | 9/2010 | Burtea et al. |

(Continued)

OTHER PUBLICATIONS

"PS627E WOW2 Oven Electric Countertop Conveyor Oven" Middleby Marshall, Inc. (Jul. 2014) 4 pages.

(Continued)

*Primary Examiner* — Brian W Jennison
(74) *Attorney, Agent, or Firm* — Michael Best & Friedrich LLP

(57) ABSTRACT

A method and arrangement is provided for setting a peak operating power level for an oven having an oven compartment, a user interface, and a controller having a memory with a maximum peak operating power level stored therein. The method includes the steps of displaying an oven set-up user interface window on the user interface during an initial start-up of the oven; in response to an input for selecting a maximum output for the oven, displaying a maximum output user interface window on the user interface. Further, after input of a peak operating power level, the method stores the peak operating power level in the memory and selectively provides a power control signal to generate heat that corresponds to the peak operating power level. The oven is either an electric oven or gas oven. In operation, the oven heats at the peak operating power level, which is less than the maximum peak operating power level.

20 Claims, 7 Drawing Sheets

(56) References Cited

U.S. PATENT DOCUMENTS

| | | | |
|---|---|---|---|
| RE43,035 E | 12/2011 | Schjerven, Sr. et al. | |
| 8,113,190 B2 | 2/2012 | Dougherty | |
| 8,541,719 B2* | 9/2013 | Steurer | H02J 3/14 219/414 |
| 8,839,714 B2 | 9/2014 | Schjerven, Sr. et al. | |
| 9,585,400 B2 | 3/2017 | Wiker et al. | |
| 9,841,261 B2* | 12/2017 | Raghavan | H05B 1/0263 |
| 2003/0213371 A1 | 11/2003 | Saunders | |
| 2005/0205547 A1 | 9/2005 | Wenzel | |
| 2008/0022993 A1 | 1/2008 | Moretti | |
| 2011/0095017 A1 | 4/2011 | Steurer | |
| 2012/0312806 A1* | 12/2012 | Burt | F24C 7/082 219/702 |
| 2013/0213951 A1 | 8/2013 | Boedicker et al. | |
| 2014/0353304 A1 | 12/2014 | Park | |
| 2014/0360382 A1 | 12/2014 | Schjerven, Sr. et al. | |
| 2016/0290655 A1* | 10/2016 | Moon | F24C 1/02 |
| 2016/0330978 A1 | 11/2016 | Schjerven, Sr. et al. | |

OTHER PUBLICATIONS

International Search Report and Written Opinion, received for International Patent Application No. PCT/US2018/036134, dated Sep. 20, 2018 (10 pages).

* cited by examiner

COOKING OVEN POWER MODULATION SYSTEM AND METHOD

BACKGROUND

Embodiments of the invention relate to methods of limiting power to an oven, such as an air impingement conveyor oven.

SUMMARY

The supply of electrical power and gas varies from country to country. For example, in some countries, electrical power available for an industrial or commercial oven is restricted. In one instance, a maximum power rating, such as 20 kilowatts (KW) is provided for a commercial oven. Ovens that operate above that rate are subject to additional fees, for example, $7,000 for each KW above 20 KW.

Of course, commercial ovens may be sized and configured to handle different loads (or cooking demands) depending on the application in which the oven is used. To achieve a desired throughput and cooking level, a commercial oven, for example, an electrical oven, may be connected to power sources having various ratings, for instance, 30 amps or 50 amps. In such instances, the ovens are configured with different burners or other components to match the power source in terms of electrical usage. Thus, an inconvenience occurs in manufacturing and installation of such ovens due to the need to manufacture or install numerous different oven configurations.

A prior approach for gas-powered ovens required providing burners with different orifice sizes or changing gas pressure provided to a gas oven depending on the gas supply. Thus, the burners must be physically changed or the pressure of a gas supply adjusted, which may require assistance of a utility employee. In one instance, an oven having a rating of 100,000 British Thermal Units (BTU)/hour (hr) is modified with replacement burners having different orifice sizes to operate at 75,000 BTU/hr.

One object of some embodiments is to provide an arrangement where burners and other components or parts do not need to be physically replaced and the maximum power rating in KW or BTU/hr. is settable or adjustable, typically before an oven is shipped or when the oven is installed.

One embodiment is directed to a method for setting a peak operating power level for an oven, the oven including an oven compartment, a user interface, and a controller having a memory with a maximum peak operating power level stored therein. The method includes displaying an oven set-up user interface window on the user interface during an initial start-up of the oven, and, in response to an input for selecting a maximum output for the oven, displaying a maximum output user interface window on the user interface. The method also includes, after receiving an input of a peak operating power level, storing the peak operating power level in the memory, and selectively providing a power control signal to generate heat that corresponds to the peak operating power level. In operation of the oven, the oven heats at the peak operating power level, which is less than the maximum peak operating power level.

Another embodiment provides an electric oven that includes an oven compartment, a first heating element, a first relay that controls power to the first heating element, a power supply that receives external electrical power and distributes power to components within the oven, a user interface for displaying user interface windows, and a controller having a memory. The controller is connected to the user interface, the power supply and to the first relay. The controller is configured to display an oven set-up user interface window on the user interface during an initial start-up of the oven, and, in response to receiving an input for selecting a maximum output for the oven, display a maximum output user interface window on the user interface. The controller is also configured to, in response to receiving an input of a peak operating power level that is less than a maximum peak operating power level, store the peak operating power level in the memory, and in operation of the oven, selectively provide a power control signal to the first relay corresponding to the peak operating power level. In operation, the electric oven heats at the peak operating power level, which is less than the maximum peak operating power level.

Another embodiment provides a gas oven that includes an oven compartment, at least one burner disposed in the oven compartment, a gas supply line for conveying fuel gas from a gas source to the burner, a modulating valve for modulating a quantity of fuel gas conveyed to the burner to control a maximum peak operating power level of heat output by the burner in the oven, an ignition module for igniting the burner, a user interface for displaying user interface windows, and a controller having a memory. The controller is connected to the user interface, the modulating valve and to the ignition module. The controller is configured to display an oven set-up user interface window on the user interface during an initial start-up of the oven, and in response to receiving an input for selecting a maximum output for the oven, display a maximum output user interface window on the user interface. The controller is also configured to, in response to receiving an input of a peak operating power level that is less than a maximum peak operating power level, store the peak operating power level in the memory. In operation, the controller provides a power control signal to the modulating valve corresponding to the peak operating power level and ignites the burner to heat the oven at the peak operating power level, which is less than the maximum peak operating power level.

One embodiment provides an arrangement wherein burners and other components or parts do not need to be physically replaced. Thus, an electric oven, may be connected to a 50 amp power source, or instead connected to a 30 amp source, and operate properly with minor adjustment.

In another embodiment for a gas oven, throttling the modulating valve in the gas train to a lower setting to provide less gas to the burners is a software control that provides an oven rated for 100,000 BTU/hr to be set at 75,000 BTU/hr with no physical changes. In yet another embodiment for a gas oven, the software control provides an oven rated for 160,000 BTU/hr to be set at 120,000 BTU/hr with no physical changes.

Other aspects of various embodiments will become apparent by consideration of the detailed description and accompanying drawings.

DETAILED DESCRIPTION

Before any embodiments are explained in detail, it is to be understood that the embodiments are not limited in its application to the details of construction and the arrangement of components set forth in the following description or illustrated in the following drawings. Other embodiments are capable of being practiced or of being carried out in various ways.

It should be noted that a plurality of hardware and software based devices, as well as a plurality of different structural components may be used to implement the various embodiments. In addition, it should be understood that the embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "controllers" described in the specification can include one or more processors, one or more memory modules including non-transitory computer-readable medium, application-specific integrated circuits (ASICs), one or more user interfaces, and various connectors connecting the components.

Figure 1:
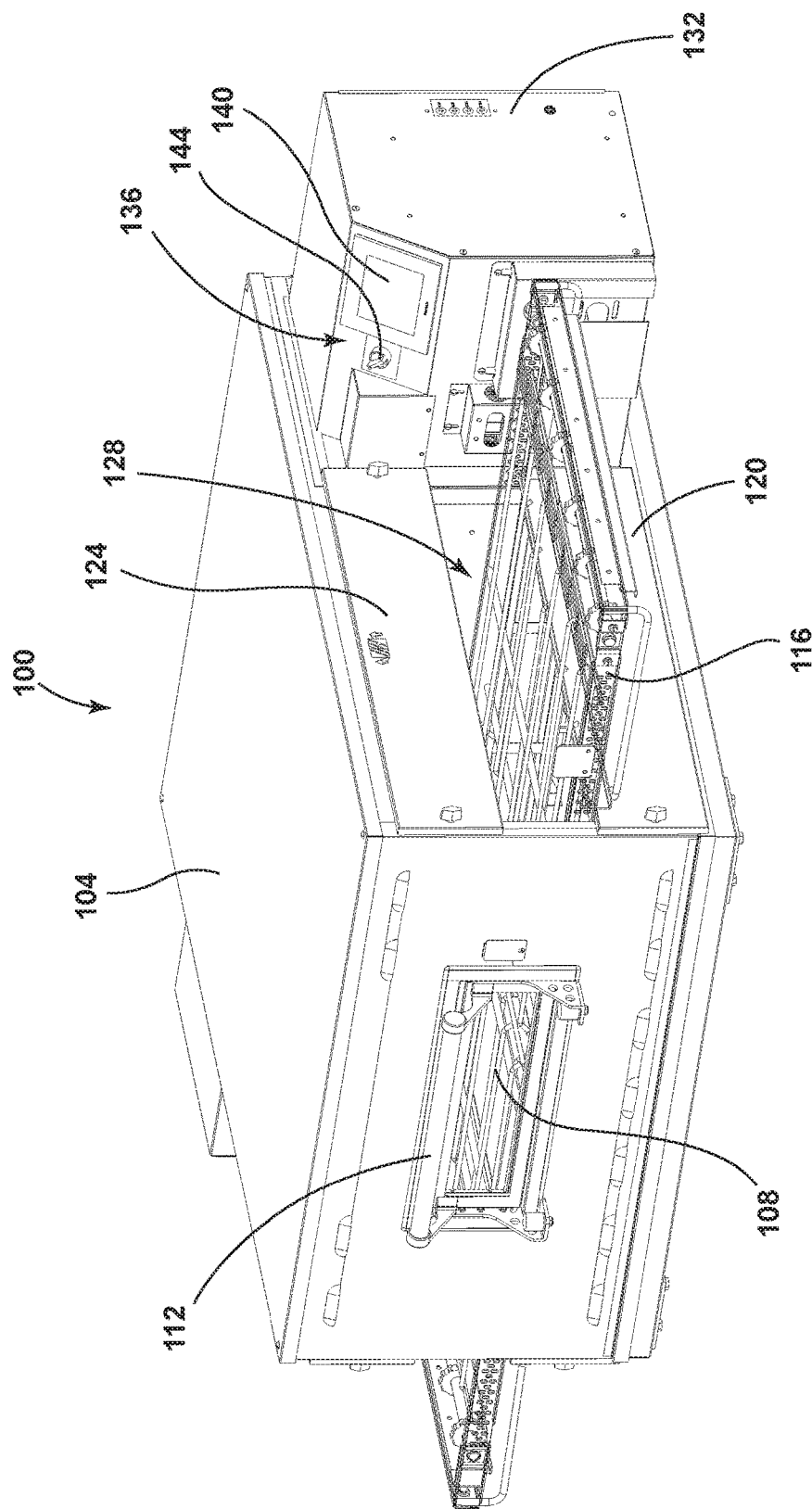
FIG. 1 is a perspective view of a conveyor oven.

FIG. 1 is a perspective view of an example conveyor oven 100 that includes an oven body 104 and a window 108 having a handle 112. In the example illustrated, the oven 100 includes a conveyor 116, a lower door 120 and an upper door 124 for defining an oven compartment 128. The oven 100 includes a controller housing 132 having a user interface 136 that includes a display 140 and a knob 144. In other embodiments, additional knobs, touch responsive switches, and a portable keypad are contemplated for providing additional inputs. In the illustrated embodiment, the display 140 is a touchscreen for displaying graphical user interfaces and receiving inputs. In another embodiment, additional touch responsive switches are provided near the display 140. In one embodiment, an insulated panel separates the oven body 104 from the controller housing 132. The conveyor oven 100 is either an electric oven or a gas oven depending on components therein and operates as an air impingement conveyor oven.

Figure 2:
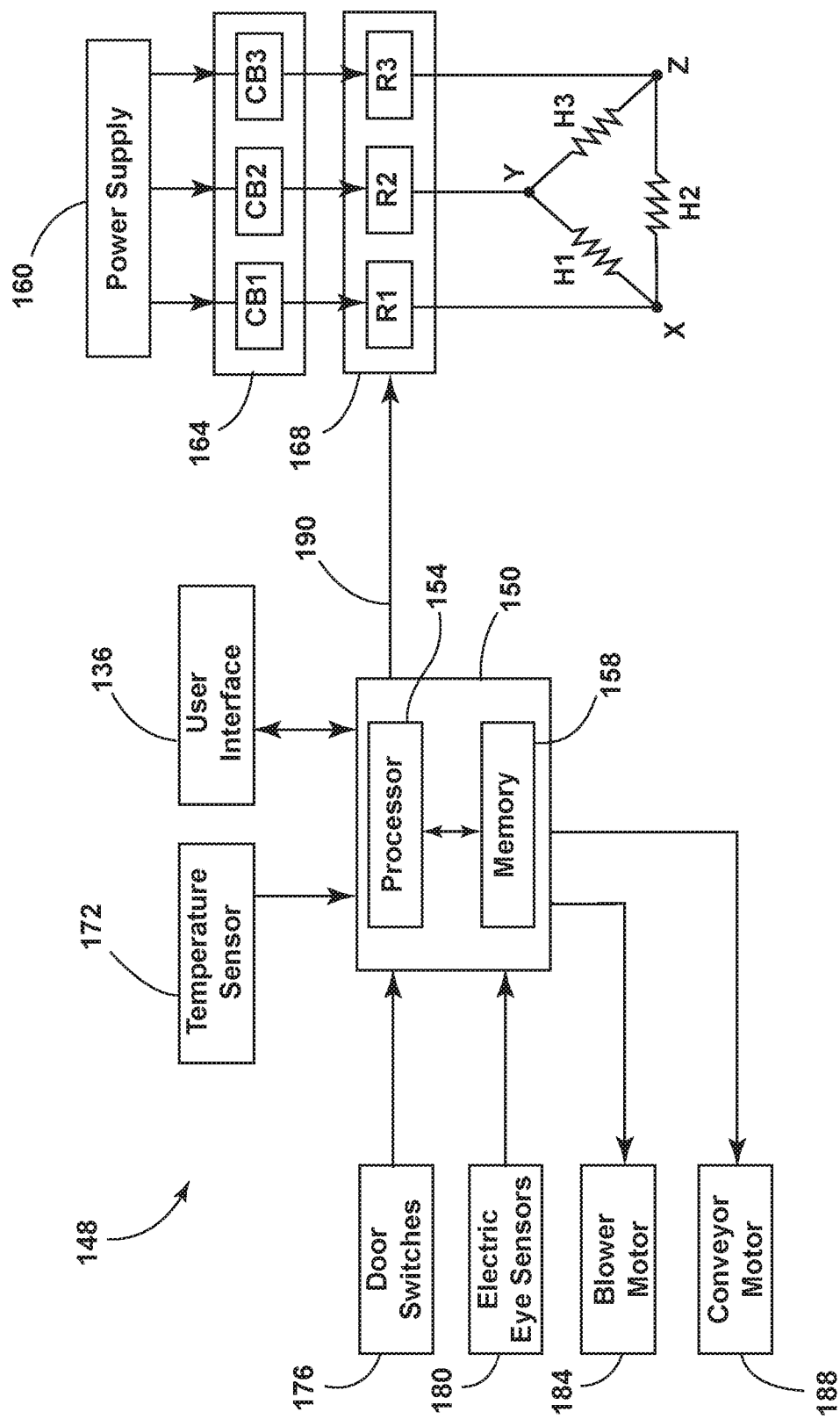
FIG. 2 is a block diagram of an electric conveyor oven.

FIG. 2 shows a block diagram 148 of a control system for an electric conveyor oven that includes a controller 150 disposed in the controller housing 132 of FIG. 1. In the illustrated embodiment, the controller 150 includes a processor 154 and a non-transitory memory 158. In one embodiment, the processor 154 executes a program stored in the non-transitory memory 158. In another embodiment, the processor 154 is a programmable logic controller.

The block diagram shown in FIG. 2 includes a power supply 160 and components, such as a circuit breaker arrangement 164 that includes circuit breakers CB1, CB2, CB3, along with a relay arrangement 168 that includes relays R1, R2, R3. The block diagram 148 shown in FIG. 2 includes electrical heating elements H1, H2, H3 that connect to the relay arrangement 168 to selectively receive electrical power in response to control signals from the controller 150 to the relay arrangement 168. One embodiment is directed to three-phase application of power to the heating elements H1, H2, H3 that define a burner.

The block diagram 148 shown in FIG. 2 further includes a temperature sensor 172 that is disposed within the oven compartment 128 to sense temperature therein. In one embodiment, the temperature sensor 172 includes one or more thermocouples to provide temperature values to the controller 158.

The block diagram 148 shown in FIG. 2 also includes door switches 176 for indicating when doors 120, 124 are open and electric eye sensors 180 for sensing placement and location of food on the conveyor 116. Further, a blower motor 184 for providing hot air is illustrated along with a conveyor motor 188 for driving the conveyor 116. A blower motor sensor (not shown) typically is a Hall effect sensor to provide an indication that the blower motor is operating for the controller 150. The controller 150 is connected to the user interface 136 and additional fuses, transformers, cooling fans, manual switches, and conveyor controls. In operation, the controller 150 provides a power control signal that is output on signal line 190 to the relay arrangement 168 to control the relays to provide three phase power to the heating elements H1, H2, H3.

Figure 3:
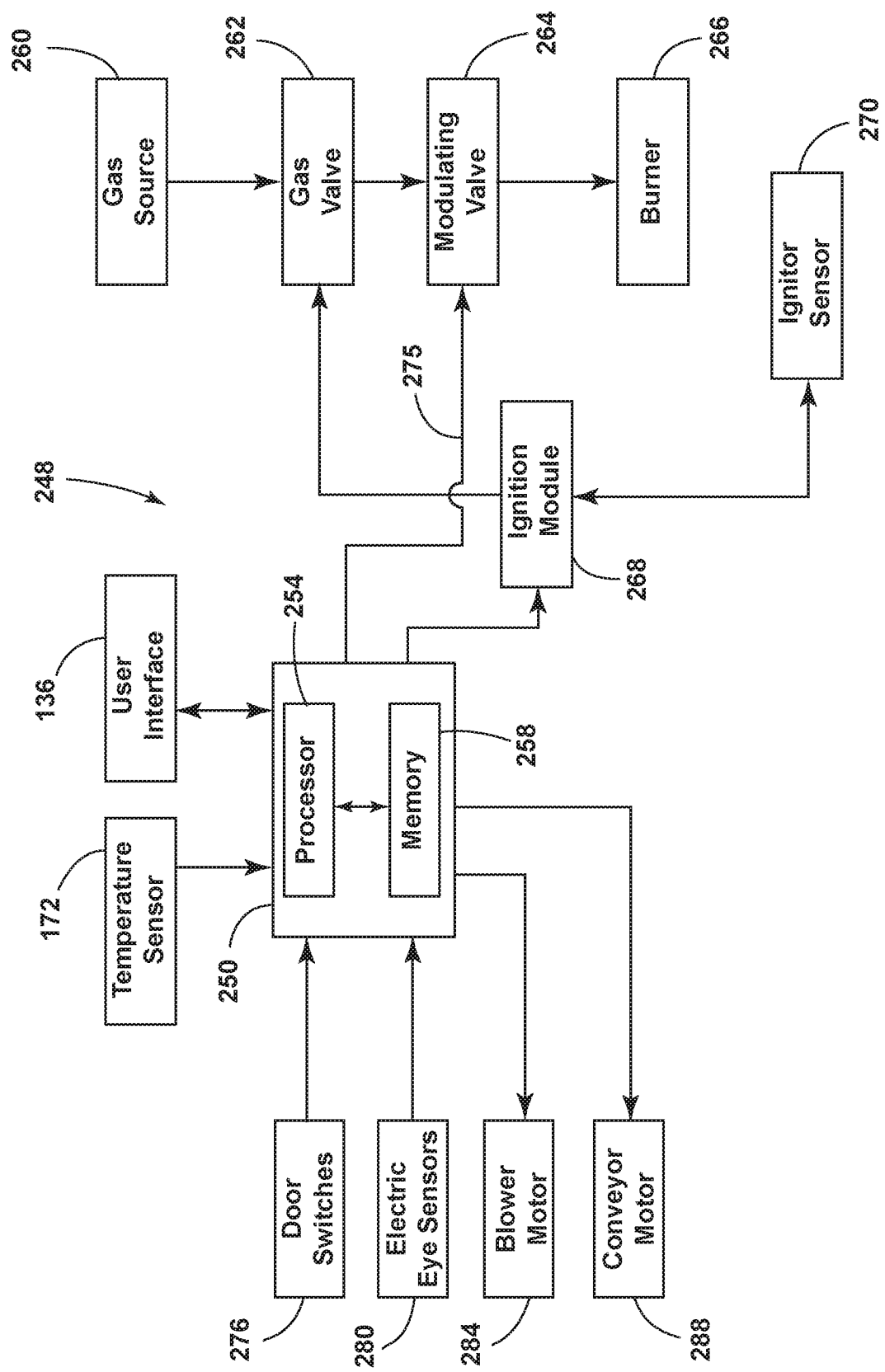
FIG. 3 is a block diagram of a gas conveyor oven.

FIG. 3 shows a block diagram 248 for a control system for a gas conveyor oven that includes a controller 250 disposed in the controller housing 132 of FIG. 1. In the illustrated embodiment, the controller 250 includes a processor 254 and a non-transitory memory 258. In one embodiment, the processor 254 executes a program stored in the non-transitory memory 258. The controller 250 electrically communicates with the user interface 136. An electrical power supply is provided to electrical components illustrated in FIG. 3.

The block diagram shown in FIG. 3 includes a fuel gas source 260 and an ON/OFF gas valve 262, a modulating valve 264 and a burner 266 for receiving gas via the valves 262, 264. In the embodiment shown in FIG. 3, the controller 250 connects to an ignition module 268. The ignition module 274 opens the gas valve 264 and connects to an ignitor sensor 270 for the burner 266. The controller 250 also provides a gas control signal to the modulating valve via the modulating valve control line 275 to control gas to the burner 266. Gas supply lines connect the gas source 260, the ON/OFF gas valve 262, the modulating valve 264, and the burner 266.

The block diagram 248 shown in FIG. 3 further includes a temperature sensor 172 that is disposed within the oven compartment 128 to sense temperature therein. As set forth above, the temperature sensor 172 includes one or more thermocouples to provide temperature values to the controller 258.

The block diagram shown in FIG. 3 also includes door switches 276 for indicating when doors 120, 124 are open and electric eye sensors 280 for sensing placement and location of food on the conveyor 116. Further, a blower motor 284 for providing hot air is illustrated along with an electric conveyor motor 288 for driving the conveyor 116. The controller 250 is connected to the user interface 136 and additional fuses, cooling fans, manual switches, and conveyor controls.

Initial Oven Set-Up

Figure 4:
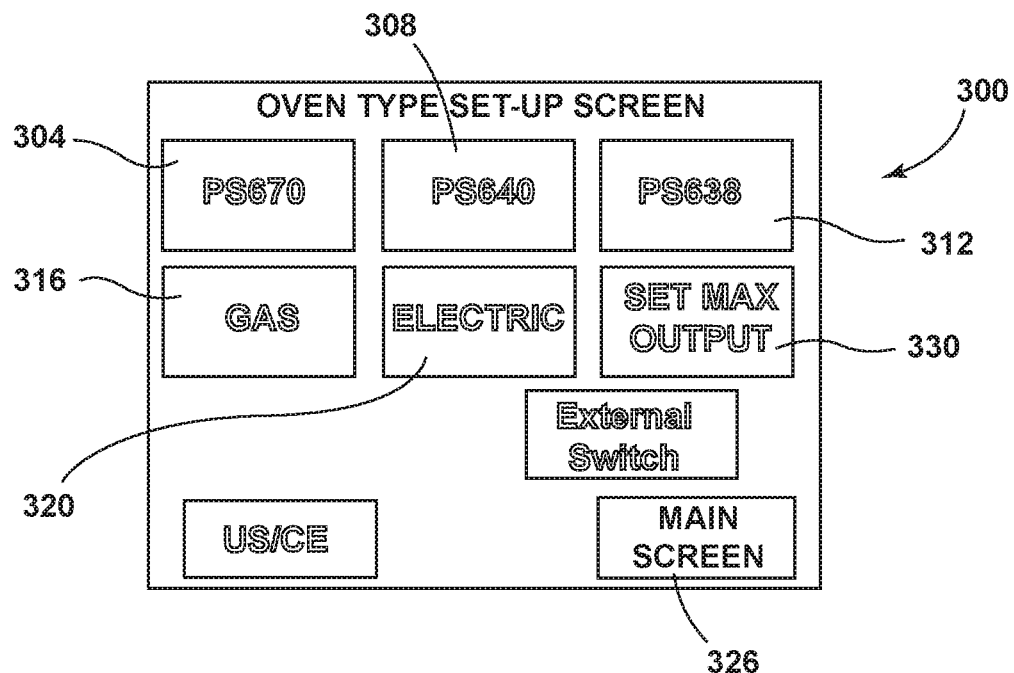
FIG. 4 is a graphical user interface for the conveyor oven.

When an oven 100 is initially powered up for a first time an oven set-up user interface window or graphical user interface 300 as shown in FIG. 4 is provided on the display 140 of FIG. 1. In one embodiment, the processor 154 of the controller 150 executes a program stored in the memory 158 to initialize the oven as follows.

First, an installation specialist provides an input to select the model of oven from the boxes 304, 308, 312 shown on the set-up user interface window 300. The selection is stored in the memory 158, 258 of the controller 158, 258. Thereafter, the type of oven is selected, either "GAS" box 316 or "ELECTRIC" box 320, and stored in the memory. A main screen box 326 is also provided to receive inputs.

Figure 5:
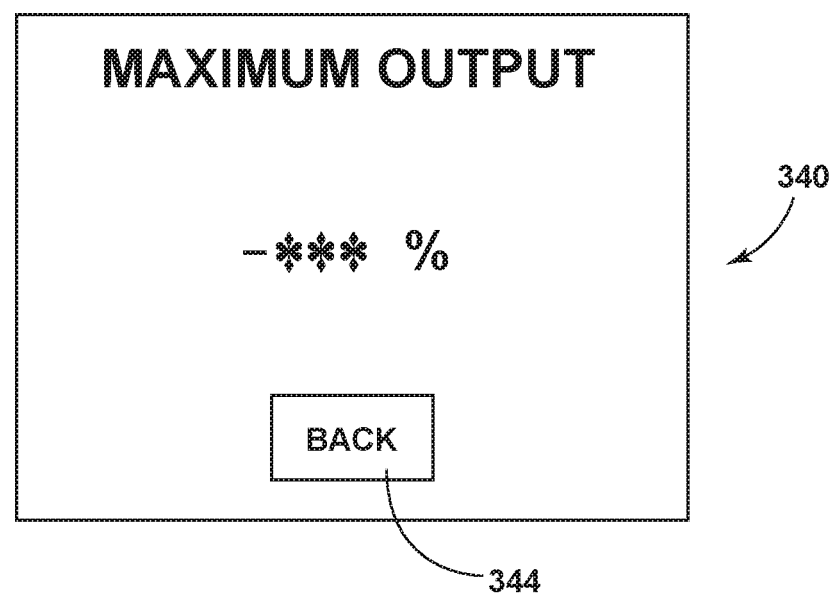
FIG. 5 is a graphical user interface for entering a peak operating power level.

In instances where the maximum power output of the oven 100 must be set lower, the "SET MAX OUTPUT" box 330 shown in the set-up user interface window 300 of FIG. 4 is selected by an input (for example, a mouse click or touch on a touchscreen when the display 140 includes a touchscreen). An input applied to the box 330 advances the controller to a maximum output user interface window or graphical user interface (GUI) 340 as shown in FIG. 5. Thereafter, touching the center of the GUI 340 provides an alphanumeric keypad graphical user interface (not shown). A percentage value for maximum peak output power of between 1% and 99% is entered onto the screen using the keypad and an enter key returns the controller to the GUI 340 shown in FIG. 5 with the percentage value displayed on the GUI. Other known graphical user interface mechanisms, such as arrow buttons, and a mini-box are also contemplated. Once a percentage is provided in FIG. 5, selecting the back button 344 causes the percentage to be stored in memory 158, 258 and 0 returns to the previous user interface window 300 shown in FIG. 4.

There are various reasons for lowering the maximum peak output power level for the oven 100. In the instance of an electric oven, the store wiring or the store amp load of the circuit panel is not sufficient for maximum peak output power level for an electric oven. In the instance of a gas oven, the output piping may not be capable of providing a maximum quantity of gas to the burner(s) of the gas oven to heat at the maximum capacity thereof. In other instances, government regulations limit the electrical power (KW) allowed without additional taxes or penalties.

Figure 6:
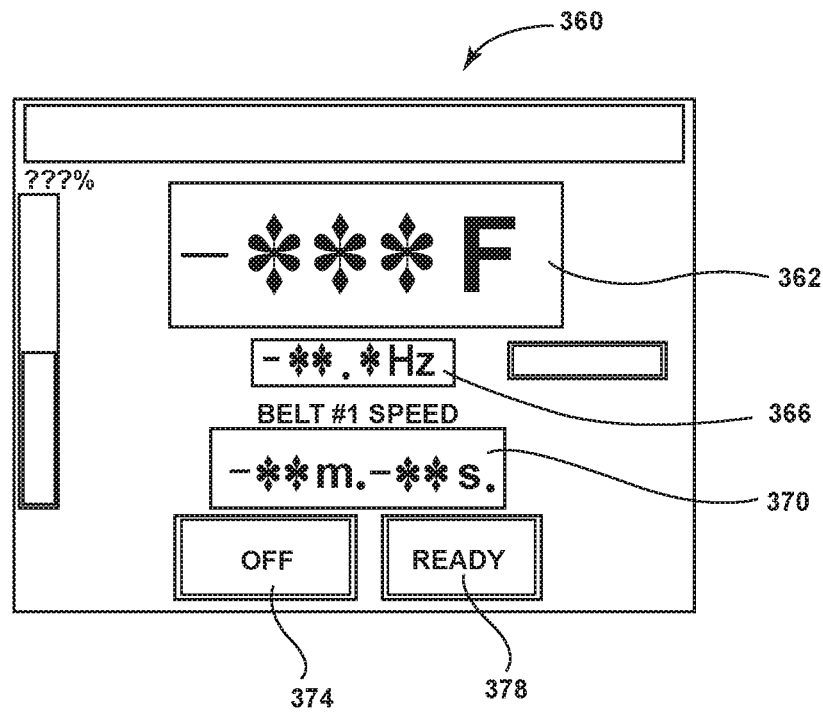
FIG. 6 is a graphical user interface for entering additional operating parameters.

Upon returning to the set-up user interface window 300 shown in FIG. 4, an installation specialist presses the main screen box 332 to discontinue oven set up and to advance to the settings user interface window or graphical user interface (GUI) 360 shown in FIG. 6.

The GUI 360 shown in FIG. 6 includes a set operating temperature indicator 362, an operating frequency box 366 and a belt speed indicator 370 for displaying a speed of the conveyor belt. Further, the GUI 360 includes on OFF box 374 for exiting the GUI 360 and turning the oven 100 off entirely. A READY indicator 378 is provided for informing whether the oven 100 is ready or "Not Ready" for use at the operating temperature. The temperature indicator 362 displays the set temperature for the oven. A READY (NOT READY) indicator 378 indicates when the oven is ready for cooking. Pressing an ENT box then stores the selected, desired temperature and returns to GUI 360 with a temperature value displayed in box 362.

Figure 7:
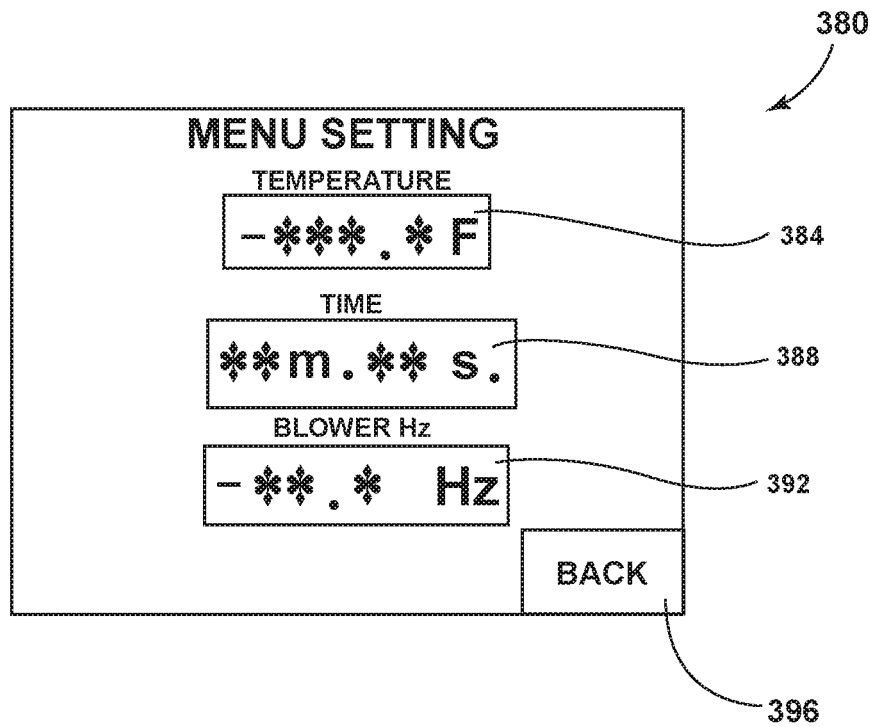
FIG. 7 is a graphical user interface for entering yet more parameters for the oven.

The operating frequency box 366 operates as follows. Pressing the operating frequency box 366 advances to the menu setting window or GUI 380 shown in FIG. 7. The GUI 380 allows entry or changing of the selected operating temperature at temperature box 384, entry of a baking or cooking time with a time box 388 related to the conveyor speed, and entry of an operating frequency for the blower at frequency box 392. A back box 396 is included. Selection of one of the boxes 384, 388, 392 results in a keypad screen or partial window that allows the selection of a numeric value and the ENT key provides a return to provide the GUI 380 of FIG. 7 on the display 140. In FIG. 7, the back box 396 provides a return to the earlier main window 360 shown in FIG. 6 on the display 140. Thereafter, the controller 150, 250 controls the oven 100 to obtain the selected operating temperature for the oven.

Reset of Peak Operating Power Level

After an initial setting of the oven 100, the oven type set-up screen 300 shown in FIG. 4 is not provided again as the oven is initialized. In one embodiment, a method for resetting of the peak operating power level with another peak operating power level is shown in a flowchart of FIG. 8.

Figure 8:
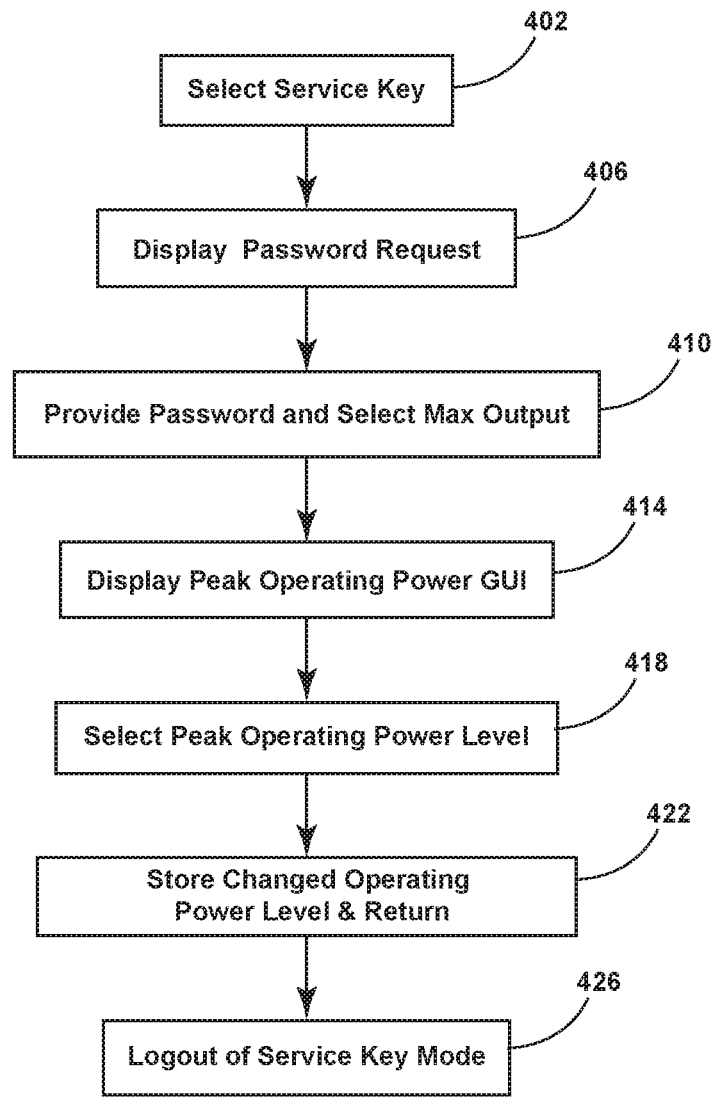
FIG. 8 is a flowchart for entering a service key and providing a password to change oven settings.

First, a hidden service key on a GUI is selected (step 402) as shown in the flow chart of FIG. 8. In one embodiment, the hidden service key is disposed to the right of the READY indicator 378 as shown in the GUI 380 of FIG. 6. As a result of the selection of a hidden key in the touchscreen of the display 140, the password window or GUI 500 shown in FIG. 9 appears on the display (step 406). Thereafter, the correct password is entered by touching the password box 504 in the password window 500 and providing the password (step 410). Thereafter, the boxes below the password box 504 are active. A basic set-up box 508, along with additional boxes including a belt setup box 512, a belt timing box 516, a monitoring screen box 520, a function testing box 524 and an END box 528 are provided.

Optionally, in one embodiment, a Set maximum output box 532 is provided. The set maximum output box 532 provides the maximum output user interface window 340 as shown in FIG. 5 to change the maximum output for an oven 100. Thus, an installation specialist can, with knowledge of a correct password, select peak operating power level at step 420 by actuating the set max output box 532 shown in FIG. 9 to display a GUI similar to the Maximum Output GUI 340 shown in FIG. 5 (step 414 in FIG. 8).

Thereafter, an installation specialist changes the peak operating power level on the GUI to another peak operating power level with a keypad function that is temporarily displayed or other arrangement (step 418). The back box 396 or equivalent box, stores the another peak operating power level that was selected in the memory 158, 258 (step 422 in FIG. 8). The installation specialist exits or logs out of the service mode by actuating END box 528 shown in FIG. 9 (step 426 in FIG. 8). In this modified embodiment, an installation specialist that has the password, changes the % value of the peak operating power level that is replaced in the memory 158, 258, for output from either of an electric oven or a gas oven.

Figure 9:
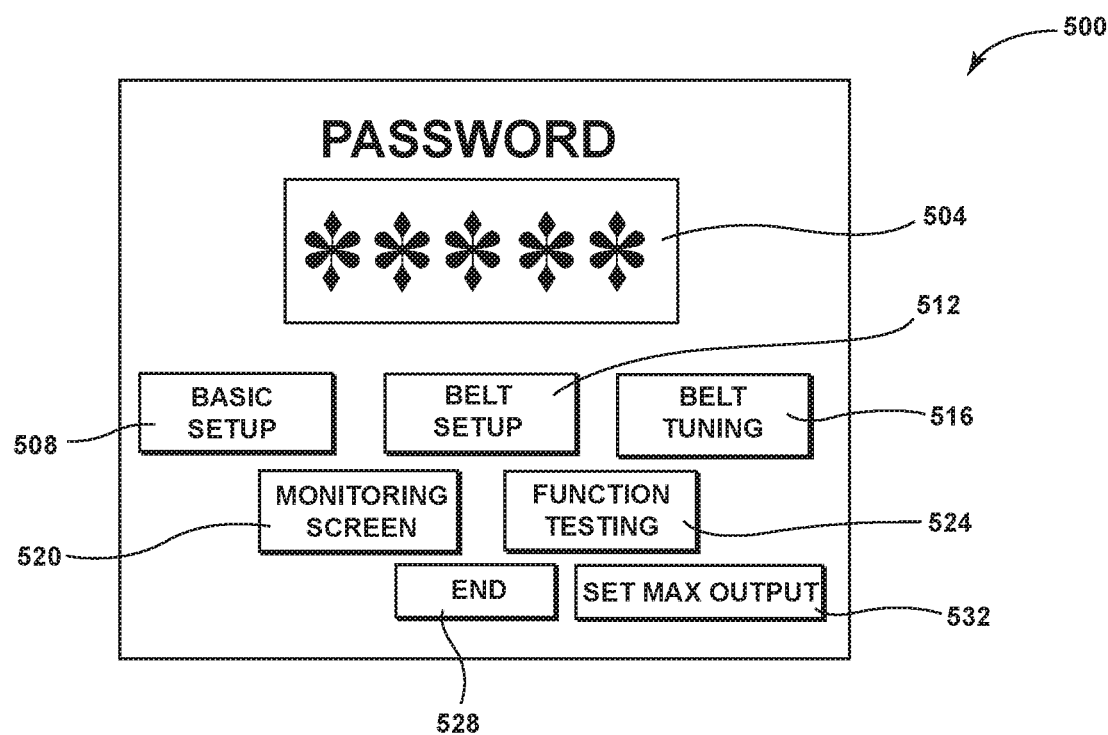
FIG. 9 is a graphical user interface or password window that includes a password box for resetting properties of the oven.

In another embodiment, the set maximum output box 532 is not provided in the GUI of FIG. 9. Instead an additional hidden key or button provided on the GUI 500 shown in FIG. 9 must be actuated on the touchscreen and additional steps performed. One reason for this approach is that upon shipment, the oven characteristics are provided on a label. Thus, changing the power characteristics would make the label incorrect.

Oven Operation at Set Operating Power Level

The electric embodiment of the oven 100 shown in FIG. 2 operates in a conventional manner, except the controller 150 provides a power control signal to the relay arrangement 168 on signal line 190 that is reduced in accordance with the set peak operating power level. In various embodiments, the electric oven has a maximum peak operating power level within a range from about 10 kilowatts to about 50 kilowatts. In one embodiment, the electric oven has a maximum peak operating power level of about 25 kilowatts. During heating, the relays R1-R3 are controlled so that the power supply 160 provides a peak operating power level that is between about 50% and about 80% of the maximum peak operating power level to the heating elements H1-H3.

In one use of the electric oven, the peak operating power level is at least 20% less than a circuit breaker power level of the circuit breakers CB1-CB3 provided with the electric oven, and the circuit breakers are not replaced to provide the lower peak operating power level. The first, second and third heating elements H1-H3 are connected to the first, second and third relays R1-R3, respectively to provide a three phase circuit arrangement.

In another use, the peak operating power level is set between about 40% and about 80% of the maximum peak operating power level for the electric oven. In one embodiment, the controller 150 is configured to send a power control signal to the first relay R1 that is selectively pulsed, so that the first relay is repeatedly actuated and de-actuated to reduce an average current provided to the first heating element H1 that corresponds to power provided thereto.

FIG. 2 shows three heating elements H1-H3 corresponding to a burner. Additional groups of heating elements corresponding to additional burners or heaters are contemplated.

The gas oven embodiment illustrated in FIG. 3 operates by the controller 250 controlling an ignition module 268 to open the ON/OFF gas valve 262 to provide fuel gas from a gas source 260 to a burner 266. The controller 250 controls the modulating valve 264 via the gas control signal line 275. The modulating valve 264 is modulated off and on to reduce the gas output to the burner 266 to control a maximum peak operating power level of heat output by the burner.

In one embodiment, the peak operating power level is between about 60% and about 80% of the maximum peak operating power level, which is about 100,000 BTU/hr. In some embodiments, the maximum peak operating power level of the gas oven is in a range from about 50,000 BTU/hr to about 250,000 BTU/hr. Thus, different gas ovens have different maximum peak operating power levels.

By setting the control of the modulating valve 264 to reduce the quantity of gas supplied to the burner, a physical replacement of the at least one burner with a different burner having smaller orifices is not necessary. While one burner 266 is shown, providing two or more burners supplied with gas are contemplated. Some embodiments include a third burner.

Various user interfaces are disclosed for entering information. Other alternatives for entering data, such as drop down menus and separate keyboards or remote control arrangements are contemplated.

Thus, embodiments provide, among other things, a method and system for setting a peak operating power level for an oven that includes displaying an oven set-up user interface window on the user interface during an initial start-up of the oven, whereby an installation specialist inputs an desired or set peak operating power level that is then stored in the memory. Thus, in operation of the oven, the oven heats at the set peak operating power level, that is less than the maximum peak operating power level. Various features and advantages of the invention are set forth in the following claims.

What is claimed is:

1. A method for setting a peak operating power level for an oven, the oven including an oven compartment, a user interface, a controller having a memory with a maximum peak operating power level stored therein, and a heating element, the method comprising:
displaying an oven set-up user interface window on the user interface during an initial start-up of the oven;
in response to receiving, via the user interface, a first input for selecting a maximum output for the oven, displaying a maximum output user interface window on the user interface;
in response to receiving, via the user interface, a second input of a peak operating power level, storing the peak operating power level in the memory;
selectively providing a power control signal to the heating element to generate heat that corresponds to the peak operating power level; and
operating the oven during a first operation, wherein the oven heats at the peak operating power level, which is less than the maximum peak operating power level.

2. The method according to claim 1, the method including during a second operation of the oven after the initial storing of the peak operating power level, displaying a password window in response to receiving, via the user interface, a third input,
in response to entry of a correct password, providing the maximum output user interface window on the user interface, and
in response to receiving, via the user interface, an input of a second peak operating power level, storing the second peak operating power level in the memory, and
exiting the maximum output user interface window.

3. The method according to claim 1, wherein the maximum peak operating power level is within a range from about 10 kilowatts to about 50 kilowatts.

4. The method according to claim 3, wherein the electric oven includes one or more circuit breakers, and wherein the peak operating power level is at least 20% less than a circuit breaker power level of the circuit breakers.

5. The method according to claim 3, further comprising receiving, via the user interface, a selected operating temperature, wherein the electric oven includes
a first heating element,
a second heating element,
a third heating element,
a first relay connected to the first heating element,
a second relay connected to the second heating element,
a third relay connected to the third heating element, and
a temperature sensor disposed in the oven compartment,
wherein the controller controls the relays to provide power to the heating elements at the peak operating power level, and reduces or stops providing power to the heating elements when the selected operating temperature is sensed by the temperature sensor.

6. The method according to claim 1, wherein the step of selectively providing a power control signal to generate heat that corresponds to the peak operating power level includes the peak operating power level being between about 50% and about 80% of the maximum peak operating power level.

7. The method according to claim 1, wherein the step of selectively providing a power control signal to generate heat that corresponds to the peak operating power level includes the peak operating power level being between about 60% and about 80% of the maximum peak operating power level.

8. The method according to claim 7, wherein the step of selectively providing a power control signal to generate heat that corresponds to the peak operating power level includes the maximum peak operating power level of the oven in a range from about 50,000 BTU/hr to about 250,000 BTU/hr.

9. An electric oven comprising:
an oven compartment;
a first heating element;
a first relay that controls power to the first heating element;
a power supply that receives external electrical power and distributes power to components within the oven;
a user interface for displaying user interface windows and receiving one or more inputs from a user; and
a controller having a memory, the controller connected to the user interface, the power supply and to the first relay, and configured to
display an oven set-up user interface window on the user interface during an initial start-up of the oven,
in response to receiving, via the user interface, a first input for selecting a maximum output for the oven, display a maximum output user interface window on the user interface,
in response to receiving, via the user interface, a second input of a peak operating power level that is less than a maximum peak operating power level, store the peak operating power level in the memory, and
during operation of the electric oven, selectively provide a power control signal to the first relay corresponding to the peak operating power level,
wherein, in operation of the electric oven, the electric oven heats at the peak operating power level, which is less than the maximum peak operating power level.

10. The electric oven according to claim 9, wherein the electric oven is an air impingement conveyor oven that includes
a conveyor extending through the oven compartment;
a conveyor motor that drives the conveyor; and
a circuit breaker disposed between the power supply and the heating element,
wherein the controller is configured to send the power control signal to the first relay that is pulsed, and wherein the first relay is repeatedly actuated and de-actuated to reduce an average current provided to the first heating element.

11. The electric oven according to claim 9, wherein the oven includes
a second heating element,
a third heating element,
a second relay connected to the second heating element, and
a third relay connected to the third heating element,
wherein the first, second and third heating elements are connected as a three phase circuit arrangement.

12. The electric oven according to claim 9, wherein the peak operating power level is between about 40% and about 80% of the maximum peak operating power level.

13. The electric oven according to claim 9, wherein the peak operating power level is less than 80% of a circuit breaker power level to break or open of circuit breakers provided with the oven.

14. The electric oven according to claim 9, wherein the controller is a programmable logic controller that is configured to
after an initial setting of the peak operating power level, display a password window in response to an input,
in response to receiving a correct password, display the maximum output user interface window on the user interface, and
in response to the input of a second peak operating power level that is less than the maximum peak operating power level, store the second peak operating power level in the memory.

15. A gas oven comprising:
an oven compartment;
at least one burner disposed in the oven compartment;
a gas supply line for conveying fuel gas from a gas source to the burner;
a modulating valve for modulating a quantity of fuel gas conveyed to the burner to control a maximum peak operating power level of heat output by the burner in the oven;
an ignition module for igniting the burner;
a user interface for displaying user interface windows; and
a controller having a memory, the controller connected to the user interface, the modulating valve and to the ignition module, and configured to
display an oven set-up user interface window on the user interface during an initial start-up of the oven,
in response to receiving, via the user interface, an input for selecting a maximum output for the oven, display a maximum output user interface window on the user interface, and
in response to receiving, via the user interface, an input of a peak operating power level that is less than the maximum peak operating power level, store the peak operating power level in the memory,
wherein, during operation of the gas oven, the controller provides a power control signal to the modulating valve corresponding to the peak operating power level and ignites the burner to heat the oven at the peak operating power level, which is less than the maximum peak operating power level.

16. The gas oven according to claim 15, the gas oven comprising a conveyor oven including
a conveyor extending through the oven compartment; and
a conveyor motor that drives the conveyor,
wherein the at least one burner is not replaced by a different burner to obtain the peak operating power level.

17. The gas oven according to claim 15, including
an ON/OFF gas valve for supplying fuel gas to the burner via the modulating valve, and
a temperature sensor for sensing temperature within the oven compartment,
wherein the ON/OFF gas valve is controlled by the controller.

18. The gas oven according to claim 15, wherein the user interface includes a touchscreen for receiving inputs.

19. The gas oven according to claim 18, wherein the user interface includes a keypad separate from the touchscreen for receiving additional inputs.

20. The gas oven according to claim 15, wherein the peak operating power level is between about 60% and about 80% of the maximum peak operating power level.

* * * * *